United States Patent [19]
Hotomi et al.

[11] Patent Number: 4,935,756
[45] Date of Patent: Jun. 19, 1990

[54] ELECTROSTATIC RECORDING MEMBER

[75] Inventors: Hideo Hotomi; Shuji Iino, both of Osaka, Japan

[73] Assignee: Minolta Camera Kabushiki Kaisha, Osaka, Japan

[21] Appl. No.: 216,372

[22] Filed: Jul. 8, 1988

[30] Foreign Application Priority Data

Jul. 11, 1987 [JP] Japan ................................ 62-173607
Jul. 11, 1987 [JP] Japan ................................ 62-173608

[51] Int. Cl.$^5$ ............................................ G01D 15/00
[52] U.S. Cl. ............................... 346/160.1; 346/153.1
[58] Field of Search ...................... 346/160, 160.1, 150, 346/153.1, 107 R, 108, 1.1; 355/219, 211; 430/56-58; 358/300, 302

[56] References Cited

U.S. PATENT DOCUMENTS 4,791,452 12/1988 Kasai et al. ......................... 355/219

OTHER PUBLICATIONS

Nikkan Kogyo Newspaper article entitled "New Type of Image Storable Photoreceptor" dated Jun. 19, 1986. Translation enclosed.

Nikkei New Materials entitled "Semiconductors and Photoelectric . . . " dated Sep. 1, 1986. Translation enclosed.

Yokoyama et al, "Image Storage . . . " Denshi Shashin Gakkaishi, vol. 24, No. 2, pp. 2-10 (1985).

*Primary Examiner*—Arthur G. Evans
*Attorney, Agent, or Firm*—Burns, Doane, Swecker & Mathis

[57] ABSTRACT

The invention provides a new electrostatic recording member with a memorizable switching layer comprising an organic compound having a metal complex structure and/or a metal chelate structure and an electrostatic latent image forming process therewith.

An electrostatic recording member of the invention can copy the same images on many sheets of paper once electrostatic latent images are formed on the electrostatic recording member.

29 Claims, 7 Drawing Sheets copy different images
retention copy
V1 copy different images
retention copy
11
12
13
14
15
16
17
18
19
20
21 copy
retention
copy different images
+V1
$V_2=-\frac{1}{5}V_1$
11
12
13
22
23
24
25
26
27
28
29
30
31
32

ELECTROSTATIC RECORDING MEMBER

BACKGROUND OF THE INVENTION

This invention relates to an electrostatic recording member which takes advantage of a memorizable switching function of plasma-polymerized layer of an organic compound having a metal complex structure and/or a metal chelate structure.

Electrophotography has taken such a basic processes since the invention of Carlson (U.S. Pat. 222,176, 1938) that a photosensitive member are corona-charged and irradiated by light to form electrostatic latent images, and then toners are developed to be transferred to a sheet of paper on which toners are fixed.

When same images are copied onto many sheets of paper, all processes above mentioned must be repeated from the first process.

Therefore, the electrophotographic processes based on Carlson's process have limitations in the simplification of the processes and the improvements for the repetition of copying.

A photosensitive member with a photo-memory function has been proposed as an adequate one for copying onto many sheets of paper (for example, Nikkan Kogyo Shinbun under the date of June 19, 1986). The photosensitive member comprises an organic photosensitive layer and a switching layer of copper-tetracyanoqunodimethane. The electrical resistance of the switching layer can be changed and maintained according to the images of manuscripts.

An electrostatic recording member suitable for copying onto many sheets of paper, which will be disclosed in the invention, comprises plasma-polymerized polymer layer of copper-acetyl-acetonato etc. which is different from the material used in the photosensitive member above mentioned.

On the other hand, Nikkei New Material (under the date of Sept. 1, 1986) discloses that the plasma polymerized layer of copper-acetylacetonato shows reversible switching phenomenon by the application of voltage. However, no uses of the plasma polymerized layer are described.

SUMMARY OF THE INVENTION

The invention is to provide an electrostatic recording member which comprises a memorizable switching layer of plasma-polymerized layer of an organic compounds having a metal complex structure and/or a metal chelate structure on an electrically conductive substrate and an electrostatic latent forming process therewith.

An electrostatic recording member comprising at least a memorizable switching layer of plasma-polymerized layer of an organic compounds having a metal complex structure and/or a metal chelate structure on an electrically conductive substrate is suitable for retention copy.

An electrostatic recording member may be constituted in combination of the above mentioned memorizable switching layer and a photoconductive layer.

DETAILED DESCRIPTION OF THE INVENTION

A plasma-polymerized layer of an organic compound having a metal complex structure and/or a metal chelate structure has found to be able to be applied to electrostatic recording member used for an electrophotographic machine during the investigation of the application of copper-acetylacetonato which shows a switching phenomenon to an electrostatic recording member.

The object of the invention is to provide a new electrostatic recording member comprising a plasma-polymerized layer of organic compounds having a metal complex structure and/or a metal chelate structure.

Another object of the invention is to provide an electrostatic recording member which can copy same images repeatedly once image informations are memorized in the electrostatic recording member.

The objects of the invention are achieved by an electrostatic recording member constituted of a memorizable switching layer of plasma-polymerized layer of an organic compound having a metal-complex structure and/or a metal chelate structure.

An electrostatic recording member of the invention may be constituted in combination with the memorizable switching layer and a photoconductive layer.

Figures 1, 2, 3, 4, 5, 6:
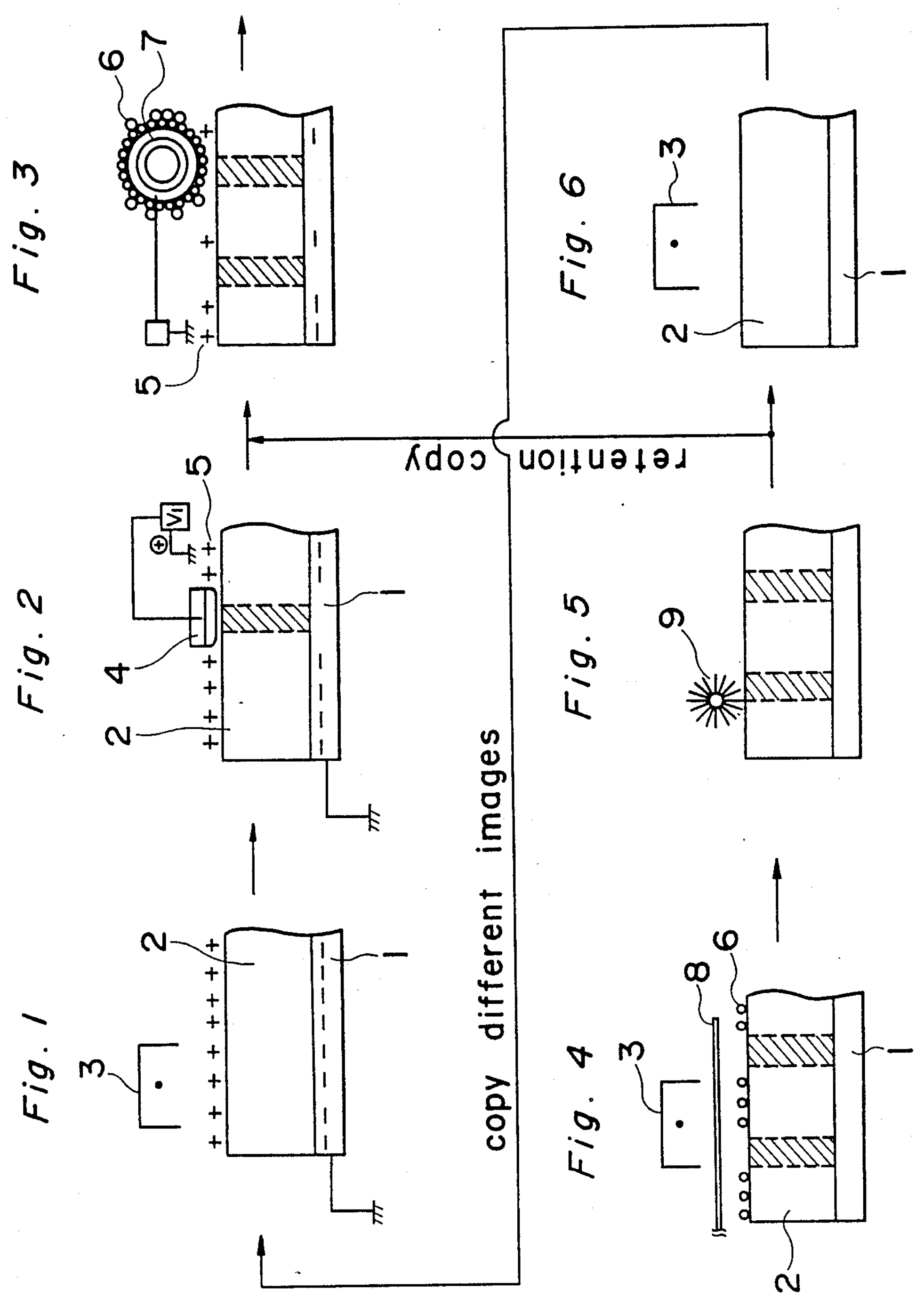
FIG. 1 illustrates an example of schematic cross-sectional view of an electrostatic recording member.
FIG. 2–FIG. 9 illustrate flow diagrams for a copying method using the electrostatic recording member in FIG. 1.

An electrostatic recording member of the invention comprises at least a memorizable switching layer (2) of plasma-polymerized layer of an organic compound having a metal complex structure and/or a metal chelate structure on an electrically conductive substrate (1) (FIG. 1). As to an electrically conductive substrate, any substrate may be used with no significance of restricting to use them so far as they have electrical conductivity. A substrate with both translucence and electrical conductivity may be used according to an desired embodiment of the invention.

An example of substrates with both translucence and electrical conductivity is an $In_2O_3$-$SnO_2$ deposited glass with 0.1 $\mu$m–0.5$\mu$m in thickness or an $In_2O_3$-$SnO_2$ sputtered resin such as polyester with 0.1 $\mu$m-0.5 $\mu$m in thickness.

There are exemplified many kinds of organic compounds having a metal complex structure and/or a metal chelate complex structure which can be used for the formation of memorizable switching layers, such as phthalocyanine compounds or copper (II) acetylacetonato and so on.

Examples of phthalocyanine compounds are metal phthalocyanine represented by the following general formula (I);

[I]

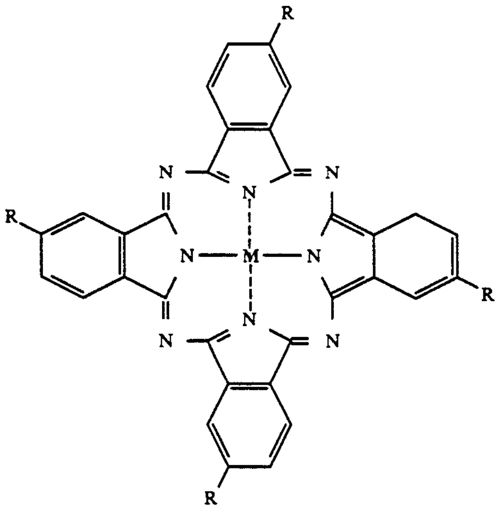

wherein M represents Cu (II(), Ni (II), Zn (II) or Mg(II), and R represents H, $OC_3H_7$, or $OC_5H_{11}$, monochloroaluminium-monochlorophthalocyanine and the like.

The other compounds may be used, such as porphyrin and compounds relating to porphyrin, which are described in, for example, page I-448-I-451 of Kagaku Binran, Kiso-hen, third revised edition edited by Nippon Kagakukai (published by Maruzen Kabusiki Kaisha) (but excluding bilirubin, haematein and haematoxylin).

Preferred organic compound having metal complex structure and/or metal chelate complex structure are metal phthalocyanine represented by the general formula (I), monochloroaluminium-monochlorophthalaocyanine, or copper (II) acethylacetonato. Particularly preferred ones are monochloroaluminium-monochlorophthalocyanine, copper (II) acetylacetonato.

The electrostatic recording member of the invention may be a structure shown in FIG. 1 and it can be prepared by vaporizing an organic compound having a metal complex structure and/or metal chelate complex structure, passing through plasma conditions of carrier gases to activate the vaporized compound indirectly and forming a layer of 9–50 μm, preferably 10–35 μm, more preferably 11–30 μm in thickness on a transparent electrode. If the layer is more than 50 μm in thickness, it is necessary to increase applied voltage in a recording process, but such an IC driver that can apply the high voltage can not be found now. If the layer is less than 9 μm, its switching function works at low applied voltage, and so voltage contrast can't be provided enough in an electrophotographic process.

Plasma-polymerized layer (1) of the invention can be formed easily on a substrate of any shape such as a drum shape and so on. In FIG. 1, a plate type substrate is shown, but cylindrical substrate can also be used. An electrostatic recording member of a cylindrical type makes it easy to constitute a high speed copying system.

A plasma-polymerized layer of an organic compound having a metal complex structure and/or a metal chelate structure, which is insulative in itself, becomes lower in electrical resistance to be electrically conductive when a specified voltage or more is applied on the layer. In the invention, the specified voltage at which a plasma-polymerized layer becomes an electrically conductive layer from an insulative layer is called as "threshold voltage"

Once a plasam-polymerized layer is applied by at least threshold voltage, it keeps low electrical resistance to function memorizably.

The layer of low electrical resistance becomes high in electrical resistance again by applying less than threshold voltage of opposite polarity or heating. In the present invention, the change from high electrical resistance of a polymerized layer to its low electrical resistance or the change from its low electrical resistance to its high electrical resistance is called "switching".

An electrostatic recording member utilizes memorizable switching function of plasma-polymerized polymer of an organic compound having metal complex structure and/or a metal chelate complex structure. More than a specified voltage or more (i.e. more than a threshold voltage or more) is applied onto a part of an electrostatic recording member. The voltage-applied part becomes electrically conductive and the other part remains electrically insulative as it is. When the electrostatic recording member with the electrically conductive part and the electrically insulative part is charged, electric charges are given and kept on the electrically insulative part. And then the electric charges are developed with toners which are transferred to a sheet of paper and fixed on it according to a conventional copying method for electrophotography. When the same images are copied on more sheets of paper, the only processes of development, transference and fixing of toners are repeated.

When an electrostatic recording member is constituted of a memorizable switching layer (12) in combination with a photoconductive layer (13) (FIG. 10), the electrostatic recording member may be prepared by forming a switching layer (12) on an electrically conductive substrate and then a photoconductive layer (13) on the switching layer (12) or by forming a photoconductive layer(13) on a electrically conductive substrate and then a switching layer (13) on the photoconductive layer.

The same electroconductive substrate (11) and the same switching layer (12) as explained on the electrostatic recording member of FIG. 1 above may be used and they can be formed in a similar way as described above.

Figures 10, 11, 12, 13, 14, 15, 16:
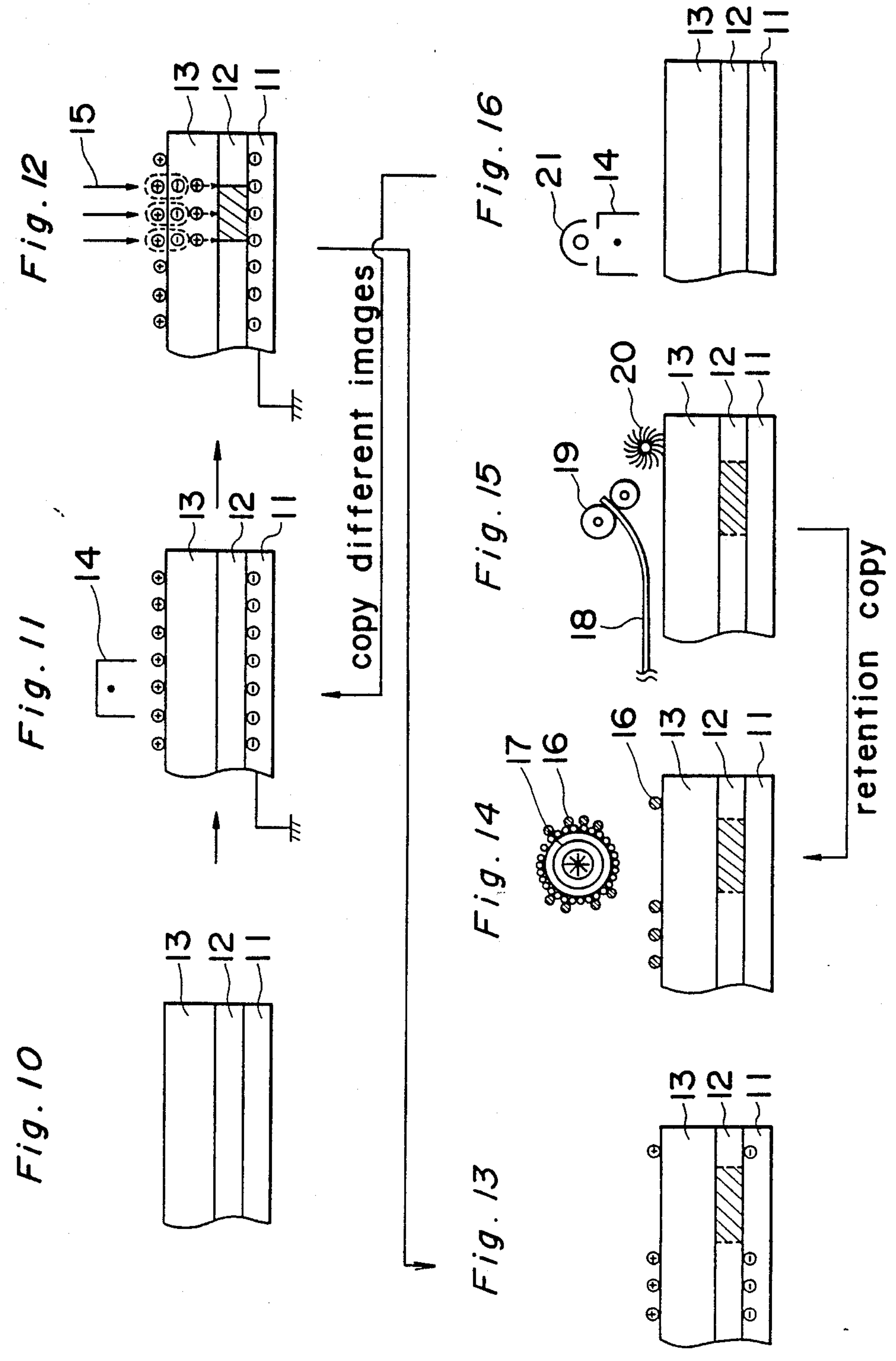
FIG. 10 illustrate another example of schematic cross-sectional view of an electrostatic recording member.
FIG. 11–FIG. 16 illustrate flow diagrams for a copying method using the electrostatic recording member in FIG. 10.

The thickness of a memorizable switching layer shown in FIG. 10 is 9–50 μm, preferably 10–35μm, more preferably 11–30 μm. If the layer is more than 50 μm in thickness, it is necessary to increase applied voltage in a recording process, but such a voltage-applying means that can apply the high voltage is not established, and if the electrically conductive roller would be used to charge an electrostatic recording member, it would need a transformer for high-voltage, and cost high. Because the voltage-sharing of a photoconductive layer becomes small, space charges inside the layer are accumulated when the electrostatic recording member is used repeatedly, and so the photoelectric transfer efficiency becomes worse. If the layer is less than 9 μm, its switching function works at low applied voltage, and so voltage contrast can't be provided enough in an electrophotographic process.

A plasma- polymerization polymer of the invention can be formed on an electroconductive substrate of any shape such as a drum shape and so on. An electrostatic recording member of a cylindrical type makes it easy to constitute a high speed copying system.

A photoconductive layer (13) can be formed by applying a solution containing an electroconductive material together with electrically insulative binder resin, if desired, a charge transporting material dispersed in an appropriate solvent on to a transparent electrode or by depositing in vacuum, sputtering, chemical vopour depositing, plasma-chemical-vopour-depositing or an ion plating of a photoconductive material, to be 0.1–50 μm, preferably 0.2–30 μm in thickness. A photoconductive layer may be formed with a plasma equipment as well as a switching layer in order to simplify the formation processes of an electrostatic recording member.

Example of photoconductive materials used in a photoconductive layer are organic substances such as bisazo pigments, triarylmethane dyes, thiazine dyes, oxazine dyes, xanthene dyes, cyanine coloring agents, styryl coloring agents, pyrylium dyes, azo pigments quinacridone pigments, indigo pigments, perylene pigments, polycyclic quinone pigments, bisbenzimidazole pigments, indanthrone pigments, squalylium pigments, phthalocyanine pigments and a plasma-polymerized thiophene; and inorganic substances such as selenium, selenium-tellurium, selenium arsesnic, cadmium sulfide and amorphous silicon. Any other material is also usable insofar as it generates charge carriers very efficiently upon absorption of light.

Amorphous silicon and phthalocyanine pigments were most preferable in the invention. The photoconductive powder of phthalocyanine pigments may be covered with a charge transporting material or treated so as to adsorb a charge transporting material.

Phthalocyanine per se known and any derivatives thereof are available such as phthalocyanines containing in the center, copper, silver, beryllium, magnecium, calcium, gallium, zinc, cadmium, barium, mercury, aluminum, indium, lanthanum, neodymium, samarium, europium, gadolinium, dysprosium, holmium, sodium, lithium, ytterbium, lutetium, titanium, tin, hafnium, lead, thorium, vanadium, antimony, chromium, molybdenum, uranium, manganese, iron, cobalt, nickel, rhodium, palladium, osmium, platinum, and so on.

A metal halide of three valence or more may be in the center of a phthalocyanine instead of metals.

Further, metal-free phthalocyanine and derivatives thereof such as tetraazophthalochyanine, tetramethyl phthalocyanine, dialkylaminophthalocyanine etc., and copper-4-aminophthalocyanine, iron polyhalophthalocyanine, cobalt hexa-phenylphthalocyanine may be used in the invention.

These phthalocyanines described above may be used singly or in combination with other phthalocyanines. A photoconductive material composition of phthalocyanine may be obtained to be used by mixing a phthalocyanine derivative substituted with at least one of an electron-attracting group instead of hydrogen in benzene structure of phthalocyanine molecule selected from the group consisting of a nitro group, a cyano group, a halogen atom, a sulfone group and a carboxy group, and at least one of nonsubstituted phthalocyanine selected from phthalocyanine and mentioned phthalocyanines, with inorganic acids which can form salts thereof, and depositing them with water or basic materials. A phthalocyanine derivative may be substituted with 1–16 electron-attracting groups in one phthalocyanine derivative molecule. A phthalocyanine derivative substituted with electron-attracting groups are mixed with non-substituted phthalocyanine so that the number of substituents may be 0.001–2, preferably 0.002–1 per one phthalocyanine molecule. Examples of inorganic acid which can form salt with phthalocyanine compounds used at the preparation of the photoconductive material composition of phthalocyanines are sulfuric acid, orthophosphoric acid, chlorosulfonic acid, hydrochloric acid, hydroiocid acid, hydrofluoric acid, hydrobromic acid, and so on.

Among photoconductive materials, particularly suitable ones to achieve the objects of the invention are metal-free phthalocyanine, copper- phthalocyanine, aluminiumchlorophthalocyanine, titanylphthalocyanine , and derivatives thereof such as electron-attracting group-substituted derivatives.

The binder to be used may be any of known thermoplastic resins or thermosetting resins having electrically insulating properties, light-curable resins and photoconductive resins. Although not limitative, examples of suitable binders are thermoplastic binders such as saturated polyester resin, polylamide resin, acrylic resin, ethylene-vinyl acetate copolymer, ion-crosslinked olefin copolymer (ionomer), styrene-butadiene block copolymer, polyallylate, polycarbonate, vinyl chloride-vinyl acetate copolymer, cellulose ester, polyimide and styrol resin; thermosetting binders such as epoxy resin, urethane resin, silicon resin, phenolic resin, melamine resin, xylene resin, alkyd resin and thermosetting acrylic resin; light-curable resins; photoconductive resins such as poly-N-vinylcarbazole, polyvinylpyrene and polyvinylanthracene; etc. These binders are usable singly or in admixture. The electrically insulating resin is preferably at least 1×10 14 ohm-cm in volume resistivity.

In the preparation of a phtoconductive layer of dispersion type, photoconductive materials are added at the ratio of 15–270 parts by weight, preferably 25–200 parts by weight, more preferably 40–150 parts by weight on the basis of 100 parts by weight of resin.

If the addition amount is less than 15 parts by weight, photoconductivity is not substantially obtained. If the addition amount is more than 270 parts by weight, it is difficult to disperse photoconductive materials in a solution and to apply it to form a photoconductive layer.

Examples of charge transporting materials, which is added to a photoconductive layer if desired, are hydrozones, oxaziazoles, triphenylmethanes, pyrazolines, styryl compounds and so on, which are generally known.

Among those compounds, most preferable ones are hydrazone compounds represented by the following general formula (I);

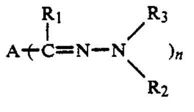

(I)

wherein $R_1$ is hydrogen, a methyl group, $R_2$ and $R_3$ are an alkyl group, an aralkyl group, an aryl group which may have a substituent, or a condensed polycyclic group which may have a substituent, A is a aromatic hydrocarbon group which may have a substituent, or an aromatic heterocyclic group, and n is a number of 1 or 2. $R_2$ and $R_3$ together may form a ring.

Said compounds are disclosed in, for example, Japanese Patent Kokai Nos. 150128/1979, 46760/1980, 154955/1980 and 52063/1980.

Charge transporting materials may be a polymer in itself such as polyvinylcarbazole, polyvinylanthracene and so on.

If charge transporting materials are added to a photoconductive layer, it is added at the content of 30–370 parts by weight, preferably 45–300 parts by weight, more preferably 50–160 parts by weight on the basis of 100 parts by weight of binder resin. If the content is less than 30 parts by weight, contrary to our expectation, the charge transportation is substantially prevented. If the content is more than 370 parts by weight, it is difficult to disperse photoconductive materials in a solution and to apply it to form a photoconductive layer.

FIG. 1–FIG. 6 show an illustrative flow diagram for copying process with an electrostatic recording member of FIG. 1.

(initial charging process)

First, a surface of an electrostatic recording member of the invention is charged positively or negatively with a corona charger(3) so that copy-images may be formed.

(electrostatic latent image forming process)

For the easy understanding, an electrostatic recording member which is charged positively is exemplified to explain the copying processes.

The copying process with an electrostatic recording member charged negatively can be conjectured from the explanations described below.

The surface of a switching layer is charged positively by corona discharge so that the surface voltage may be lower than the threshold voltage of the switching layer made of plasma-polymerized layer, preferably 50–200 V lower than the threshold voltage, more preferably 60–150 V lower than the threshold voltage on the basis of an electrically conductive grounding substrate (1).

If the applied voltage is 200 V lower than the threshold voltage, copy-images with light tone are formed on copy paper on account of low voltage-contrast between information parts and non-information parts. If the applied voltage is very near to the threshold voltage, the switching layer is activated as the temperature inside the copying machine increases and so the undesired parts may be liable to be switched.

After a switching layer is corona-charged positively to an adequate voltage, a positive voltage is further applied in accordance with shapes of informations such as characters, letters which are desired to be embodied as copy-images by, for example, a multistylus head (4) so that the voltage of the parts may be higher than the threshold voltage. The parts applied with higher voltage than the threshold voltage becomes electroconductive. The charges on the surface of the parts pass through the switching layer (2) to neutralize negative charges induced near the surface of the electroconductive substrate. The other parts keeps the positive charges on the surface, whereby electrostatic latent images are formed. An applied voltage to a switching layer (2) in an electrostatic latent image forming process is sufficient so far as it is the threshold voltage or more. Desirably, it is 30–150 V, preferably 50–100 V higher than the threshold voltage in order to make electroconductivity more certain, whereby electrostatic latent images with clear contrast are formed. (developing process)

After the electrostatic latent image forming process, electrostatic latent images (5) (FIG. 3) are developed with toners (6) charged oppositely to the polarity of the electrostatic latent images (i.e. negatively). A conventional means such as a magnetic sleeve (7) development method or a cascade development method are applicable to the developing process.

(transferring process)

The developed toners (6) are transferred to a sheet of copy paper (8) charged oppositely (i.e. positively) to the toners (6) by a corona charger (3) (FIG. 4). The toners may be transferred to a sheet of copy paper taking advantage of the electric field. Other conventional means may be applicable to the transferring process in the invention.

(fixing process)

Toners transferred onto the sheet of copy paper (8) are fixed with appropriate means such as a heating roller.

(cleaning process)

The toners on the switching layer (2) which are not transferred are cleaned by an adequate means such as blash cleaning (9), blade cleaning, web cleaning and air-blow-cleaning (FIG. 5).

Further, when the same informations are copied onto one more sheet of papers, all processes (initial charging process, electrostatic latent image forming process, developing process, transferring process, fixing process and cleaning process) may not be repeated and the so called retention copy can be carried out, that is the same images as those formed on a first sheet of copying paper can be copied on the second sheet of copying paper from the developing process (FIG. 3), followed by the transferring process and the fixing process. The retention copy makes it possible to copy same images on many sheets of copy paper. Therefore, once electrostatic latent images are formed, the same images can be copied on many sheets of copying paper without a initial charging process and a latent image forming process. According to the invention, it is possible to make Carlson's process brief when the same images are copied on many sheets of copying paper.

(charging up process)

When the amount of charges of electrostatic latent images becomes insufficient, switching layer is charged again with a corona charger. Because the parts where higher voltage than the threshold voltage has already applied keep electrically conductive, they are not charged but the only parts of high electrical resistance are charged. The retention copy can be continuously carried out.

(erasing process)

In order to extinguish electrostatic latent images, the switching layer (2) is charged oppositely to the charged polarity in the initial charging process, namely negatively. The positive charges remaining on the surface are neutralized and the low electrically resistant parts are returned to high electrical resistance (FIG. 6). When the electrostatic latent images are extinguished, the switching layer (2) should not be applied at the threshold voltage or more.

Figure 9:
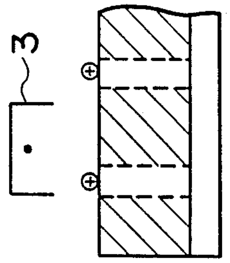
Figure 8:
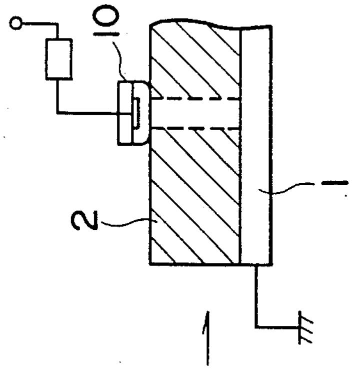
Figure 7:
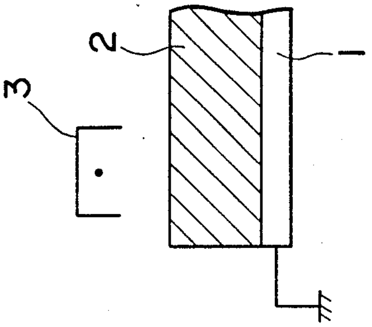

Another copying method with an electrostatic recording member of FIG. 1 is shown from FIG. 7 to FIG. 9.

(uniform switching process)

First, all the surface of switching layer (2) is applied at the threshold voltage or more with a corona charger (3) to make all the switching layer low electrically resistant (FIG. 7).

Information parts desired to be embodied as copy-images are heated with, for example, a thermal head (10) to be highly electrically resistant (FIG. 8). The highly electrically resistant parts are charged positively when all the surface is charged again with the corona charger (3) to form electrostatic latent images (FIG. 9). In this case, the highly electrically resistant parts should be corona-charged so that the voltage of the threshold voltage or more may not be applied. In more detail, it is desirable that the surface of the highly electrically resistant parts are charged so that the voltage which is 50–200 V lower than the threshold voltage may be applied as aforementioned. After the formation of electrostatic latent images, a development process, a transferring process, a fixing process, cleaning process, charging up process, and an erasing process are carried out as similarly as explained in FIG. 3–FIG. 6 respectively.

FIG. 10–FIG. 16 show an illustrative flow diagram for copying process with an electrostatic recording member of FIG. 10.

(initial charging process)

First, all the surface of an photoconductive layer (13) is charged positively with a corona charger (14). In the initial charging process, the surface is charged so that the sharing voltage of the switching layer may be lower than the threshold voltage of the switching layer made of plasma-polymerized layer, preferably 50–200 V lower than the threshold voltage, more preferably 60–150 V lower than the threshold voltage.

If the sharing voltage is 200 V lower than the threshold voltage, copy-images with light tone are formed on copy paper on account of low voltage-contrast between information parts and non-information parts. If the applied voltage is very near to the threshold voltage, the switching layer is activated as the temperature inside the copying machine increases and so the undesired parts may be liable to be switched.

(electrostatic latent image forming process)

After the surface of photoconductive layer (13) is charged positively, it is irradiated with light in accordance with shapes of informations from over the surface. Photocarriers are generated inside light-exposed parts of photoconductive layer, and negative carriers reach to the surface to extinguish positive charges on the surface. On the other hand, positive carriers move through the photoconductive layer (13) to the surface of switching layer (12). Parts of the switching layer (showed by slant lines in FIG. 12) which contact with irradiated parts of photoconductive layer result in being applied at the threshold voltage or more of a plasma-polymerized layer constituting the switching lay (12) and they switch from electroinsulative to electroconductive. The not-irradiated surface of the photoconductive layer (13) keeps positive charges for the electrostatic latent images.

(developing process)

After the electrostatic latent image forming process, electrostatic latent images are developed with toners (16) charged oppositely to the polarity of the electrostatic latent images (i.e. negatively)(FIG. 14). A conventional means such as a magnetic sleeve (17) development method or a cascade development method are applicable to the developing process.

(transferring process)

The developed toners (16) are transferred to a sheet of copy paper (18) charged oppositely (i.e. positively) to the toners (16) by a corona charger(14) (FIG. 15). The toners may be transferred to a sheet of copy paper taking advantage of the electric field. Other conventional means may be applicable to the transferring process in the invention.

(fixing process)

Toners transferred onto the sheet of copy paper (18) are fixed with an appropriate means such as a heating roller (19).

(cleaning process)

The toners on the electrostatic recording member which are not transferred are cleaned by an adequate means such as blash cleaning (20), blade cleaning, web cleaning and air-blow cleaning (FIG. 15).

Further, when the same informations are copied onto one more sheet of paper, all processes (initial charging process, electrostatic latent image forming process, developing process, transferring process, fixing process and cleaning process) may not be repeated. The same images as those formed on a first sheet of copying paper can be copied on the second sheet of copying paper from the developing process (FIG. 14), followed by the transferring process and the fixing process. Therefore, once electrostatic latent images are formed, the same images can be copied on many sheets of copying paper without a initial charging process and a latent image forming process. According to the invention, it is possible to make Carlson's process brief when the same images are copied on many sheets of copying paper.

(erasing process)

In order to extinguish electrostatic latent images, the photoconductive layer (13) is charged oppositely to the charge polarity in the initial charging process, namely negatively while it is irradiated with a erasing lamp (21). The positive charges remaining on the surface are neutralized and the low electrically resistant parts are returned to high electrical resistance (FIG. 16). When the electrostatic latent images are extinguished, the switching layer (12) should not be applied at the threshold voltage or more. Because negative charges may remain on the surface of the electrostatic recording member even after the erasing process, it is desirable to extinguish them by charging positively with a charger.

Figures 17, 18, 19, 20, 21, 22, 23, 24:
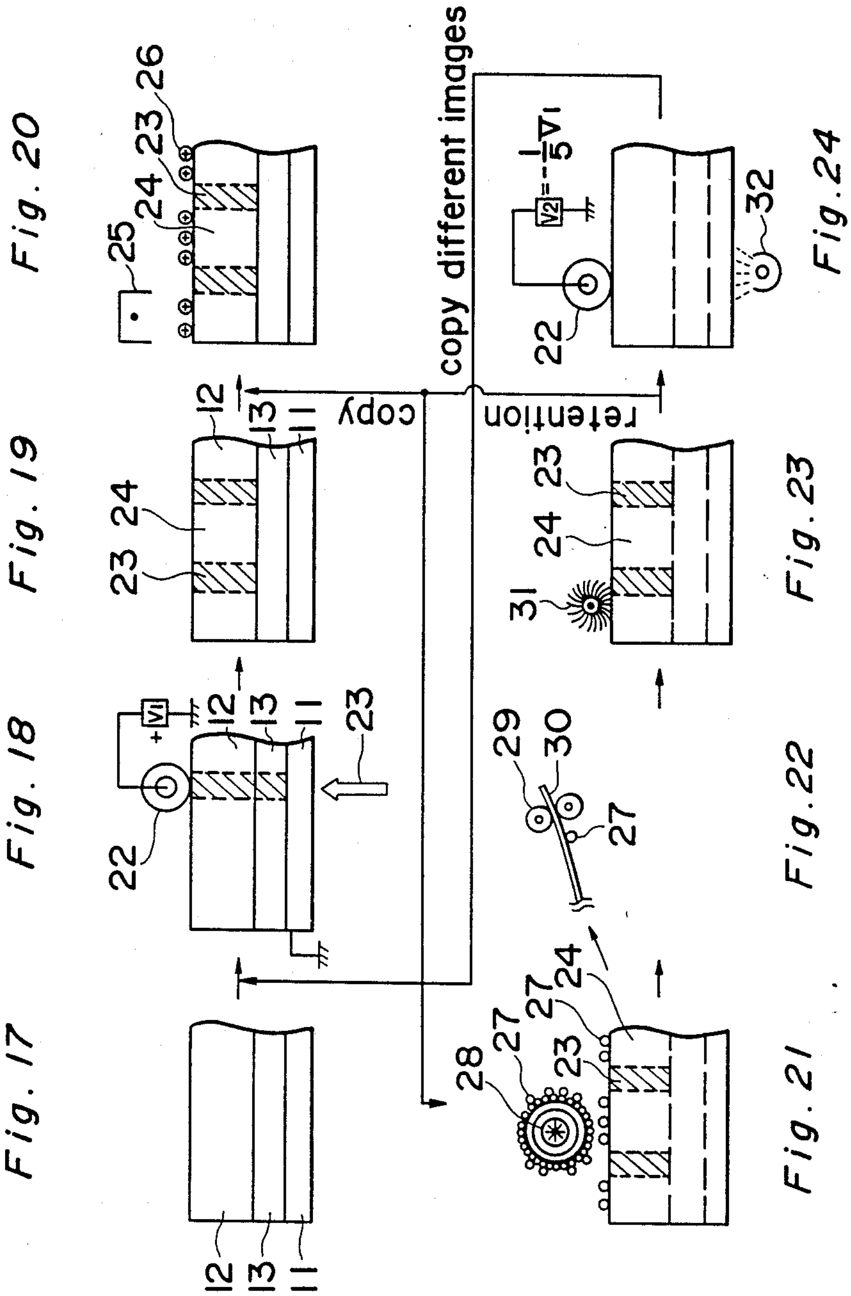
FIG. 17–FIG. 24 illustrate another flow diagrams for a copying method using the electrostatic recording member in FIG. 17.

Another copying method with an electrostatic recording member of FIG. 17 comprising a photoconductive layer (13) on an electroconductive substrate (11) and a switching layer (12) on the photoconductive layer (13) is shown from FIG. 17 to FIG. 24.

(information writing-in process)

While the threshold voltage or more are applied onto a switching layer with, for example, an electroconductive roller (22) as shown in FIG. 18, the back side of the photoconductive layer is irradiated with light in accordance with the desired shapes of informations. The light-irradiated parts of the photoconductive layer (13) become electroconductive and that the contacting parts of the switching layer (12) with the light-irradiated parts of the photoconductive layer (13) alter from electrically insulative to low electrically resistant. Low electrically resistant parts in the switching layer are showed by slant lines from FIG. 18 thereafter. The desired patterns are formed by low electrically resistant parts (23) and high electrically resistant parts (24) in the switching layer.

(electrostatic latent image forming process)

Then, the switching layer is charged positively and uniformly with a corona charger (25). Only the low electrically conductive parts in the switching layer are charged to form electrostatic latent images (FIG. 20)

(developing process)

After the electrostatic latent image forming process, electrostatic latent images are developed with toners (27) charged oppositely to the polarity of the electrostatic latent images (i.e. negatively). A conventional means such as a magnetic sleeve development method or a cascade development method are applicable to the developing process.

(transferring process)

The developed toners are transferred to a sheet of copy paper charged oppositely to the toners by a corona charger (not shown). The toners may be transferred to a sheet of copy paper taking advantage of the electric field.

(fixing process)

Toners transferred onto the sheet of copy paper (30) are fixed with appropriate means such as a heating roller (29).

(cleaning process)

The toners on the electrostatic recording member which are not transferred are cleaned by an adequate means such as a blash cleaning (31), blade cleaning, web cleaning and air-blow cleaning (FIG. 23).

Further, when the same informations are copied onto one more sheet of paper, all processed (information writing-in process, electrostatic latent image forming process, developing process, transferring process, fixing process and cleaning process) may not be repeated. The same images as those formed on a first sheet of copying paper can be copied on the second sheet of copying paper from the developing process (FIG. 21), followed by the transferring process and the fixing process. Therefore, once electrostatic latent images are formed, the same images can be copied on many sheets of copying paper without a information write-in process and a latent image forming process. According to the invention, it is possible to make Carlson's process brief when the same images are copied on many sheets of copying paper.

(charging up process)

When the amount of charges of electrostatic latent images becomes insufficient, all the surface of switching layer is charged again with a corona charger (25) (FIG. 20). Thereafter, a developing process, a transferring process, a fixing process are repeated. It is effective to charge up them every about 5 times of copying.

(erasing process)

In order to extinguish electrostatic latent images, the backside of the transparent electrode (11) is irradiated with a erase lamp (32) while all the surface of the switching layer is applied uniformly with, for example, a electroconductive roller (22) at about fifth of voltage with opposite polarity to that applied in the information write-in process (FIG. 24).

A corona charger may also be used in the erasing process instead of the electroconductive roller (22). That is, the surface of the switching layer (12) is charged oppositely to the charged polarity in the electrostatic latent image forming process, namely negatively while the photoconductive layer (13) is irradiated with a erasing lamp. The positive charges remaining on the surface are neutralized and the low electrically resistant parts are returned to high electrical resistance. When the electrostatic latent images are extinguished, the switching layer (12) should not be applied at the threshold voltage or more. Because negative charge may remain on the surface of the electrostatic recording member even after the erasing process, it is desirable to extinguish them by charging positively with a charger.

When both the information writeing-in process and the electrostatic latent image forming process shown in from FIG. 17 to FIG. 20 are carried out at the same time with the electrostatic recording member in FIG. 17, the surface of the switching layer (12) is charged with a corona charger while the back side of the electroconductive substrate is irradiated with light in accordance with the shapes of information. Thereafter, the developing process, the transferring process and the erasing process are carried out similarly as explained in from FIG. 21 to FIG. 23 above mentioned.

Figure 25:
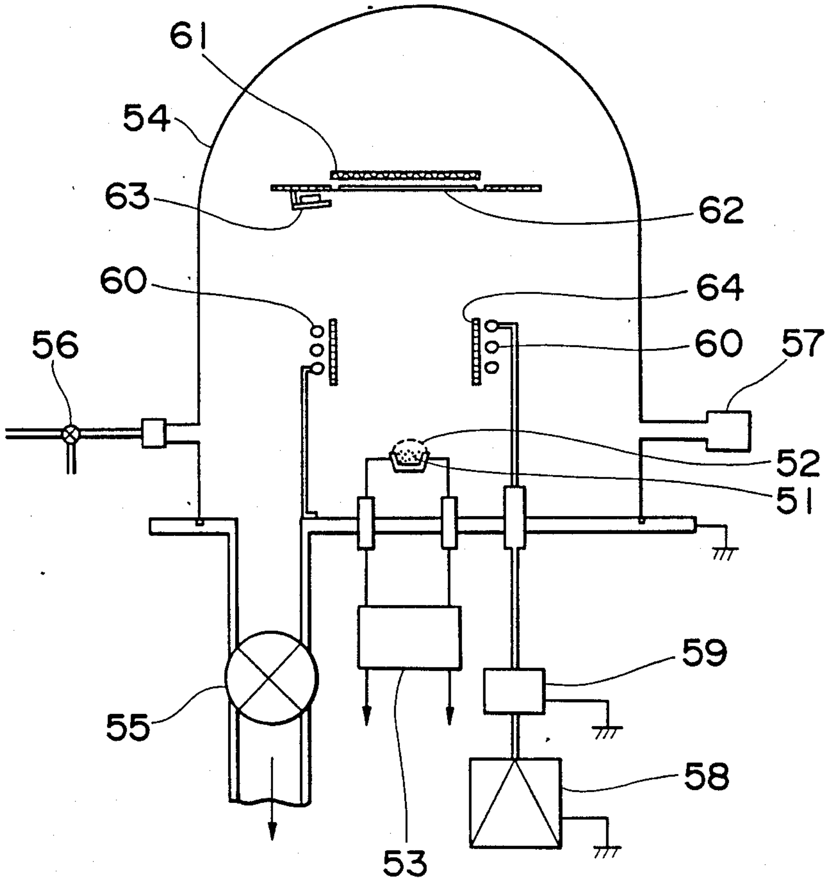
FIG. 25 and FIG. 26 illustrate schematic view of plasma polymerization equipments for the formation of a memorizable switching layer.
Figure 26:
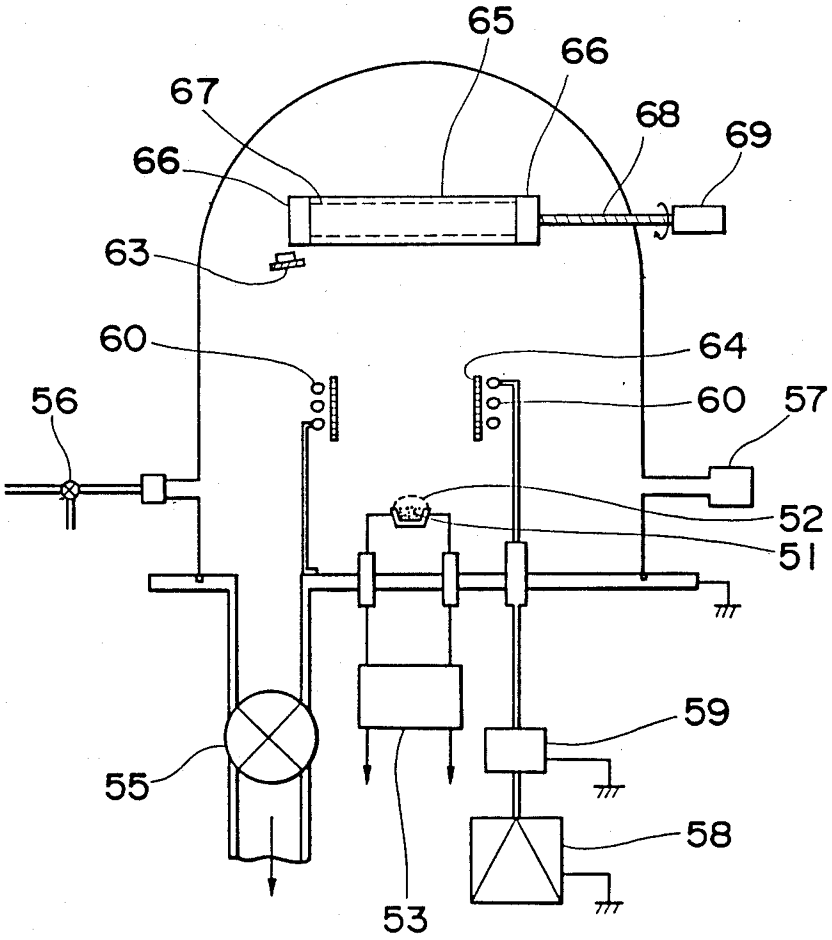

FIG. 25 and FIG. 26 show examples of plasma polymerization equipments for the formation of a memorizable switching layer.

Desired organic compounds having a metal complex structure and/or a metal chelate structure (51) are placed in a boat (52) having a cup with boles which can be heated by means of electric power applied through a transformer for heater (53). The inside of a bell jar (54) is vacuumized to the level of about $5\times10^{-5}$ Torr through a main valve (55) by a vacuum system (not shown). The pressure value inside the bell jar is read by a pressure gauge (57). When the inside of a bell jar is vacuumized to a specified vacuum level, a valve (56) is opened to introduce a carrier gas for plasma generation (for example, argon, monomer gas such as hydrocarbon compounds) into the bell jar. After the flow rate of carrier gas is stabilized, the boat (52) is heated to a specified temperature by means of electric power applied through the transformer for heater (53) to vaporize the organic compounds having a metal complex structure and/or a metal chelate structure (51), and at the same time, plasma is generated by applying electric power through a matching box (59) from a high frequency electric power source (58) (frequency; 1 KHz–13.56 MHz) to an inductive coil (60) sheathed in quartz pipe. And then a plasma-polymerized layer of the organic compounds having a metal complex structure and/or a metal chelate structure is formed to the specified layer thickness on an electrically conductive substrate which is preheated to the specified temperature with a heater (61) while the thickness of the layer is being measured by a layer thickness monitor (63). A photoconductive layer comprising a photoconductive material may be formed on an electrically conductive substrate (62) when preparing an electrostatic recording member shown in FIG. 17.

A plasma polymerization equipment shown in FIG. 26 is used in order to form a switching layer on an electrically conductive substrate of cylindrical type. The cylindrical substrate (65) is installed to a holder for cylindrical substrate (66) which is connected to a motor (69) by a shaft (68) and can be rotated with the motor (69). The cylindrical substrate (65) may be heated with a heater (67) installed inside the substrate. The other structure of the equipment and the operation processes are same as explained on the plasma polymerization equipment shown in FIG. 25.

Particularly preferred electrostatic recording members A and B with the structure in FIG. 1 are prepared and used as shown below.

| | materials | thickness (μm) | threshold voltage (V) | Processes of FIG. 1-FIG. 6: initial charging (V) | Processes of FIG. 1-FIG. 6: formation of electrostatic latent image (V) | Processes of FIG. 7-FIG. 9: uniform switching (V) | Processes of FIG. 7-FIG. 9: charging (V) |
|---|---|---|---|---|---|---|---|
| electrostatic recording member A | | | | | | | |
| switching layer | monochloro-aluminun-monochloro-phthalocyanine | 20 | 355 | 250 | 200 | 400 | 290 |
| transparent electrode | $In_2O_3$—$SnO_2$ | 0.1-0.5 | | | | | |
| electrostatic recording member B | | | | | | | |
| switching layer | Cu (II) acetyl acetonato | 20 | 355 | 250 | 200 | 400 | 290 |
| transparent electrode | $In_2O_3$—$SnO_2$ | 0.1-0.5 | | | | | |

The electrostatic recording members A and B were formed with a plasma polymerization equipment shown in FIG. under the following conditions;

| | |
|---|---|
| flow rate of carrier gas (Ar): | 10 sccm |
| temperature of electroconductive substrate: | about 80° C. |
| frequency: | 13.56 MHz |
| applied electric power: | 30 W |
| electric discharge time: | about 7.5 hours |

Figure 27:
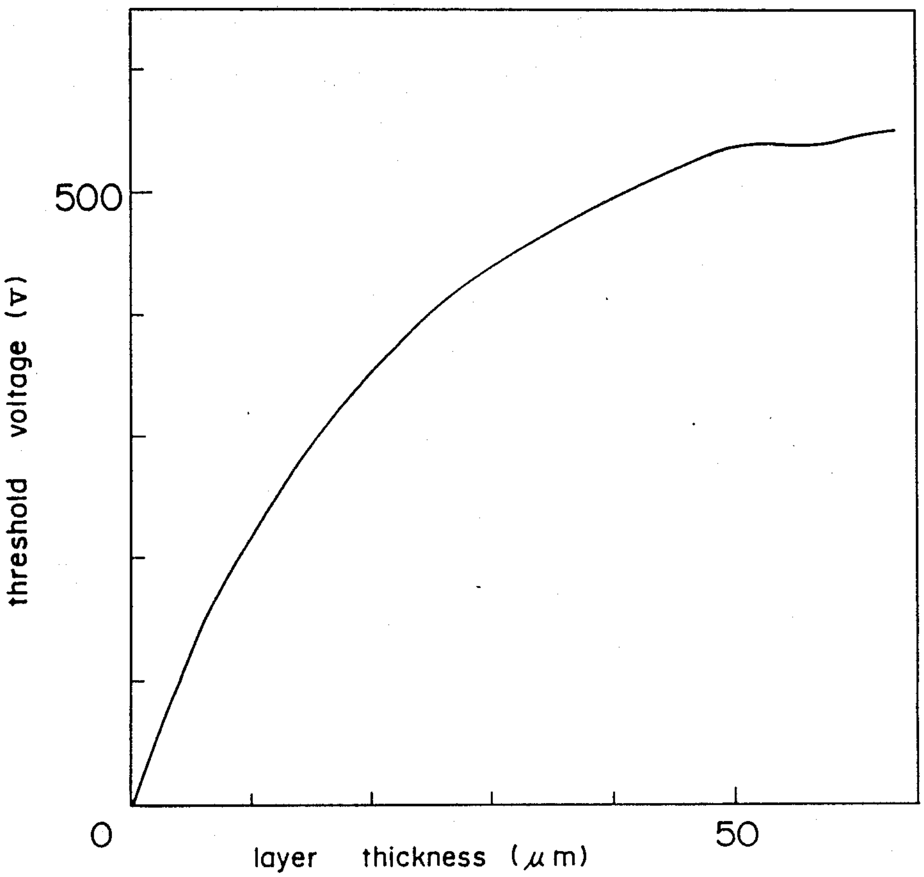
FIG. 27 in an example of the relationship between the threshold voltage and the thickness of the switching layer.

FIG. 27 shows the relationship between the threshold voltage and the thickness of the switching layer (2) of the electrostatic recording member A. The electrostatic recording member B has the relationship between the threshold voltage and thickness similar to the electrostatic recording member A. Preferred electrostatic recording members C and D with the structure in FIG. 10 and FIG. 17 are prepared and used as shown below.

| | materials | thickness (μm) | threshold voltage (V) | Processes of FIG. 10-FIG. 16: initial charging (V) | Process of FIG. 17-FIG. 24: uniform switching (V) | Process of FIG. 17-FIG. 24: charging (V) |
|---|---|---|---|---|---|---|
| electrostatic recording member C | | | | | | |
| switching layer | monochloro-aluminum-monochloro-phthalocyanine | 17.5 | 325 | 400 | 450 | 400 |
| photo-conductive layer | Cu-phthalocyanine dispersed in acrylic-melamine resin | 12.5 | | | | |
| transparent electrode | $In_2O_3$—$SnO_3$ | 0.1-0.5 | | | | |

| | materials | thickness (μm) | threshold voltage (V) | Processes of FIG. 10-FIG. 16: initial charging (V) | Process of FIG. 17-FIG. 24: information writing in (V) | Process of FIG. 17-FIG. 24: charging (V) |
|---|---|---|---|---|---|---|
| electrostatic recording member D | | | | | | |
| switching layer | Cu (II) acetyl acetonato | 18 | 330 | 400 | 450 | 400 |
| photo-conductive layer | amorphous silicon (Boron is added at 3 ppm) | 12 | | | | |
| transparent electrode | $In_2O_3$—$SnO_3$ | 0.1-0.5 | | | | |

The switching layers of the electrostatic recording member C and D were formed with a plasma polymerization equipment shown in FIG. 25 under the following conditions.

| | |
|---|---|
| flow rate of carrier gas (Ar): | 10 sccm |
| temperature of electroconductive substrate: | about 75° C. |
| frequency | 5 MHz |
| applied electric power: | 30 W |
| electric discharge time: | about 6.7 hours. |

What is claimed is:

1. An electrostatic recording member for retaining an electrostatic latent image comprising a memorizable switching layer formed on an electrically conductive substrate, wherein said memorizable switching layer is a plasma-polymerized layer of organic compounds with a metal complex structure and/or a metal chelate structure, and the thickness of said memorizable switching layer is 9 to 50 μm.

2. An electrostatic recording member of claim 1 wherein the organic compounds with a metal complex structure and/or a metal chelate structure is copper-phthalocyanine.

3. An electrostatic recording member of claim 1, wherein the organic compounds with a metal complex structure and/or a metal chelate structure is copper (II)-acetylacetonato.

4. An electrostatic recording member of claim 1, wherein the organic compounds with a metal complex structure and/or a metal chelate structure is monochloroaluminium-monochlorophthalocyanine.

5. An electrostatic recording member for retaining an electrostatic latent image comprising a memorizable switching layer and a photoconductive layer formed on an electrically conductive substrate, wherein said memorizable switching layer is a plasma-polymerized layer of organic compounds with a metal complex structure and/or a metal chelate structure the thickness of said memorizable switching layer is a 9 to 50 μm, and the thickness of said photoconductive layer is 0.1 to 50 μm.

6. An electrostatic recording member of claim 5, wherein the organic compounds with a metal complex structure and/or a metal chelate structure is copper-phthalocyanine.

7. An electrostatic recording member of claim 5, wherein the organic compounds with a metal complex structure and/or a metal chelate structure is copper (II)-acetylacetonato.

8. An electrostatic recording member of claim 5, wherein the organic compounds with a metal complex structure and/or a metal chelate structure is monochloroaluminium-monochlorophthalocyanine.

9. An electrostatic latent image forming process, which comprises forming retentive electroconductive parts and electrically-insulative parts in an electrostatic recording member comprising a memorizable switching layer made of plasma-polymerized organic compounds with a metal complex structure and/or a metal chelate structure on an electrically conductive substrate, by applying the voltage higher than the threshold voltage of the switching layer to the switching layer in accordance with a pattern of information.

10. An electrostatic latent image forming process, which comprises forming retentive electroconductive parts and electrically-insulative parts in an electrostatic recording member comprising an electrically conductive substrate, a memorizable switching layer and a photoconductive layer, wherein the memorizable layer is a plasma-polymerized layer of organic compounds with a metal complex structure and/or a metal chelate structure, by applying the voltage higher than the threshold voltage of the switching layer to the switching layer in accordance with a pattern of information.

11. An electrostatic latent image forming process, which comprises forming retentive electroconductive parts and electrically-insulative parts in an electrostatic recording member having a memorizable switching layer made of plasma-polymerized organic compounds with a metal complex structure and/or a metal chelate structure on an electrically conductive substrate by charging the electrostatic recording member to the voltage lower than the threshold voltage of the switching layer and then further charging the electrostatic recording member so that the voltage higher than the threshold voltage is applied in accordance with a pattern of information.

12. An electrostatic latent image forming process, which comprises forming retentive electroconductive parts and electrically-insulative parts in an electrostatic recording member having a memorizable switching layer made of plasma-polymerized organic compounds with a metal complex structure and/or a metal chelate structure on an electrically conductive substrate by charging the electrostatic recording member to the voltage higher than the threshold voltage of the switching layer and then heating the electrostatic recording member partially by a heating means in accordance with a pattern of information and then further charging the electrostatic recording member to the voltage lower than the threshold voltage of the switching layer.

13. An electrostatic latent image forming process, which comprises forming retentive electroconductive parts and electrically-insulative parts in an electrostatic recording member having a photoconductive layer on a memorizable switching layer made of plasma-polymerized organic compounds with a metal structure and/or a metal chelate structure over an electrically conductive substrate by charging the electrostatic recording member so that the switching layer is applied to the voltage lower than the threshold voltage of the switching layer and then the electrostatic recording member is irradiated with light in accordance with a pattern of information.

14. An electrostatic latent image forming process, which comprises forming retentive electroconductive parts and electrically-insulative parts in an electrostatic recording member having a memorizable switching layer made of plasma-polymerized organic compounds with a metal structure and/or a metal chelate structure on a photoconductive layer over an electrically conductive transparent substrate by irradiating the electrostatic recording member with light in accordance with a pattern of information from the electrically conductive transparent substrate while the switching layer is charged to the voltage higher than the threshold voltage of the switching layer.

15. A method for copying same image repeatedly once image information is memorized in an electrostatic recording member comprising a memorizable switching layer made of plasma-polymerized organic compounds with a metal complex structure and/or a metal chelate structure on an electrically conductive substrate, the method comprising following steps;

(a) forming an electrostatic latent image which comprises retentive electroconductive parts and electrically-insulative parts in said electrostatic recording member;
(b) developing said electrostatic latent image by developer;
(c) transferring the developed image onto a transfer member;
(d) removing said developer remaining on said electrostatic recording member after the transfer; and
(e) repeating said steps of (b) to (d) to obtain a plurality of same image.

16. A method for copying same image repeatedly of claim 15, wherein the electrostatic latent image is formed by charging the electrostatic recording member to the voltage lower than the threshold voltage of the switching layer and then further charging the electrostatic recording member so that the voltage higher than the threshold voltage is applied in accordance with a pattern of information.

17. A method for copying same image repeatedly of claim 15, wherein the electrostatic latent image is formed by charging the electrostatic recording member to the voltage higher than the threshold voltage of the switching layer and then heating the electrostatic recording member partially by a heating means in accordance with a pattern of information and then further charging the electrostatic recording member to the voltage lower than the threshold voltage of the switching layer.

18. A method for copying same image repeatedly once image information is memorized in an electrostatic recording member comprising an electrically conductive substrate, a memorizable switching layer and a photoconductive layer, wherein the memorizable layer is a plasma-polymerized layer of organic compounds with a metal complex structure and/or a metal chelate structure, the method comprising following steps;

(a) forming an electrostatic latent image which comprises retentive electroconductive parts and electrically-insulative parts in said electrostatic recording member;

(b) developing said electrostatic latent image by developer;

(c) transferring the developed image onto a transfer member;

(d) removing said developer remaining on said electrostatic recording member after the transfer; and (e) repeating said steps of (b) to (d) to obtain a plurality of same image.

19. A method for copying same image repeatedly of claim 18, wherein the electrostatic latent image is formed by charging the electrostatic recording member comprising a photoconductive layer on a memorizable switching layer made of plasma-polymerized organic compounds with a metal structure and/or a metal chelate structure over an electrically conductive substrate so that the switching layer is applied to the voltage lower than the threshold voltage of the switching layer and then the electrostatic recording member is irradiated with light in accordance with a pattern of information.

20. A method for copying same image repeatedly of claim 18, wherein the electrostatic latent image is formed by irradiating the electrostatic recording member comprising a memorizable switching layer made of plasma-polymerized organic compounds with a metal structure and/or a metal chelate structure on a photoconductive layer over an electrically conductive transparent substrate with light in accordance with a pattern of information from the electrically conductive transparent substrate while the switching layer is charged to the voltage higher than the threshold voltage of the switching layer.

21. An electrostatic recording member of claim 1, wherein the thickness of said memorizable switching layer is 10 to 35 μm.

22. An electrostatic recording member of claim 5, wherein the thickness of said memorizable switching layer is 10 to 35 μm.

23. An electrostatic recording member of claim 5, wherein the thickness of said photoconductive layer is 0.2 to 30 μm.

24. An electrostatic recording member of claim 5, wherein said photoconductive layer is an amorphous silicon layer.

25. An electrostatic recording member of claim 5, wherein said photoconductive layer contains a photoconductive material dispersed in a binder resin.

26. An electrostatic recording member of claim 5, wherein the amount of said photoconductive material is 15 to 270 parts by weight on the basis of the binder resin of 100 parts by weight.

27. An electrostatic recording member of claim 5, wherein said photoconductive layer contains a photoconductive material and charge transporting material dispersed in a binder resin.

28. An electrostatic recording member of claim 27, wherein the amount of said charge transporting material is 30 to 370 parts by weight on the basis of the binder resin of 100 parts by weight.

29. An electrostatic recording member of claim 25, wherein said photoconductive material is a phthalocyanine pigment.

* * * * *